United States Patent [19]

Voznick

[11] 4,454,370
[45] Jun. 12, 1984

[54] THERMOCOUPLE SURFACE PROBE

[75] Inventor: Henry P. Voznick, Arcadia, Calif.

[73] Assignee: Wahl Instruments, Inc., Culver City, Calif.

[21] Appl. No.: 415,338

[22] Filed: Sep. 7, 1982

[51] Int. Cl.³ .......................................... H01L 35/28
[52] U.S. Cl. ..................... 136/221; 29/573; 136/230; 374/179; 374/208
[58] Field of Search ............... 136/221, 230; 374/179, 374/208, 209; 29/573

[56] References Cited

U.S. PATENT DOCUMENTS

| | | |
|---|---|---|
| 2,839,594 | 6/1958 | Schneidersmann ................ 136/4 |
| 2,988,582 | 6/1961 | McGregor et al. ................ 136/221 |
| 3,151,484 | 10/1964 | Feehan et al. ..................... 73/359 |
| 3,533,288 | 10/1970 | Franck .............................. 73/343 |
| 3,589,192 | 6/1971 | Sabovik ............................. 73/344 |
| 3,681,990 | 8/1972 | Barrett et al. ................. 136/221 X |
| 3,741,816 | 6/1973 | Wagner ............................. 136/228 |
| 3,834,237 | 9/1974 | Robertson .......................... 73/359 |
| 4,001,045 | 1/1977 | Smith ................................ 136/230 |
| 4,101,343 | 7/1978 | Feichter et al. .................. 136/230 |
| 4,118,986 | 10/1978 | Werner et al. ................ 374/179 X |
| 4,155,776 | 5/1979 | Romer ............................... 136/217 |

FOREIGN PATENT DOCUMENTS 596931  4/1960 Canada .................... 136/221

OTHER PUBLICATIONS

Instruments, vol. 20, Aug. 1947, p. 730.

Primary Examiner—Leland A. Sebastian
Attorney, Agent, or Firm—Gausewitz, Carr, Rothenberg & Edwards

[57] ABSTRACT

A pair of resilient side-by-side elongated coils of different thermocouple material are mounted in a ceramic housing and project forwardly with their forward ends connected to form a thermocouple junction that is adapted to be pressed against a surface of which temperature is to be measured. A retractable protective sleeve is spring-urged to a forward position in which it extends beyond the end of the thermocouple housing and is retractable, when the probe is pressed against the surface, to a limit position in which the end of the ceramic thermocouple housing is maintained just clear of the surface, while the resilience of the thermocouple coils enables good contact of the junction and the surface.

4 Claims, 5 Drawing Figures

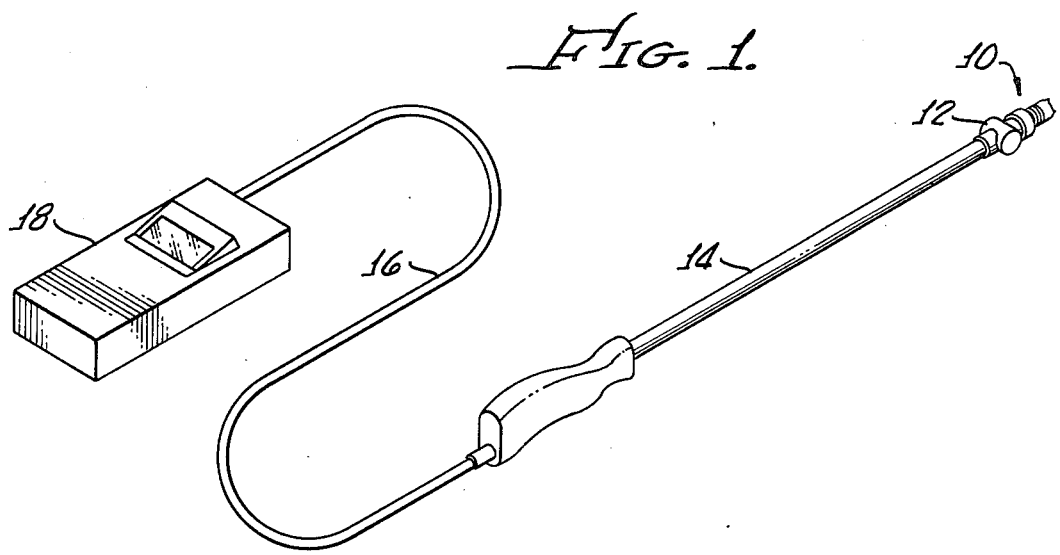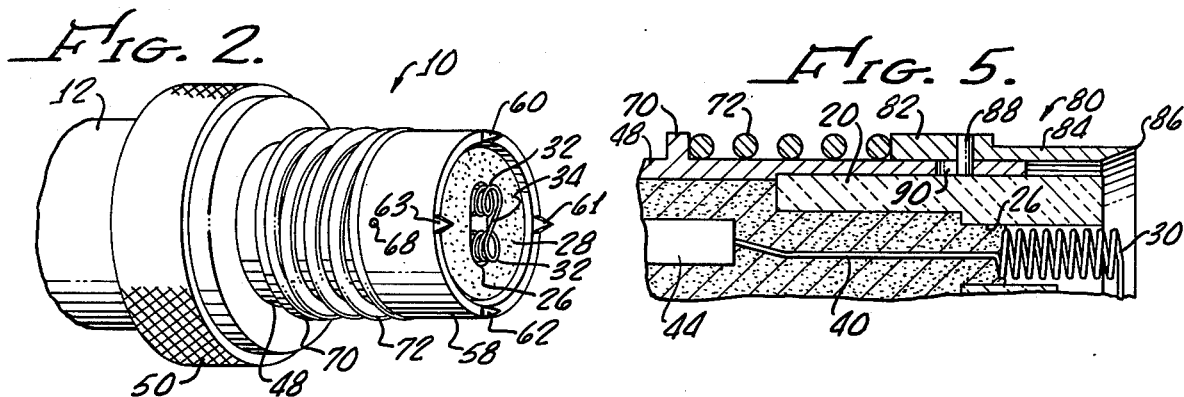

THERMOCOUPLE SURFACE PROBE

BACKGROUND OF THE INVENTION

The present invention relates to portable temperature sensing surface probes and more particularly concerns a probe of improved reliability and more rugged construction.

Portable temperature probes are used for sensing temperature in many different applications and are made of many different configurations. Commonly, such probes use platinum resistance temperature detectors (RTD's) or thermocouples and are made, in general, for immersion or for surface contact. The surface contacting probes employing platinum resistance frequently have the sensing element encased within an enclosed body of high heat conductivity and thus provides some measure of protection for the delicate sensor resistor. Such complete protective enclosures are not available with a thermocouple sensor in which the thermocouple junction must be placed in direct contact with a surface to be measured. If direct contact between the thermocouple junction and the surface to be measured is prevented, as by complete enclosure of the junction, the loss is thermal sensitivity may be so great as to be unacceptable in many precision applications. In U.S. Pat. No. 3,834,237 to Robertson a thermocouple surface temperature probe is shown which employs a metal shield surrounding the thermocouple wires, the shield being open at its surface contacting end to permit exposure of the thermocouple junction. In such an arrangement the thermocouple junction projects outwardly of the thermocouple probe body and outwardly of the protective shield and thus is subject to undesired or inadvertent impact or abrasion which can seriously damage the thermocouple junction or its mounting structure. Attempts to place the protective shield close enough to the junction in order to provide adequate physical protection adversely affect the precision temperature sensing and may require supplementary heater sections to heat the shield, as described in the Roberts patent.

Accordingly, it is an object of the present invention to provide a surface temperature probe that minimizes or avoids above-mentioned problems.

SUMMARY OF THE INVENTION

In carrying out principles of the present invention in accordance with a preferred embodiment thereof, a portable heat sensing surface probe includes a connector body mounting a thermocouple housing, which in turn carries a resiliently mounted, forwardly projecting thermocouple sensor. A protective sleeve circumscribes both the forward end of the housing and the projecting sensor, and is slidably mounted for movement between an extended position in which the sleeve extends forwardly of the sensor and its housing, to guard the sensor against inadvertent contact, and a retracted position in which the forward end of the sleeve is retracted to allow contact of the sensor with the surface. According to one feature of the invention, stop means are provided to prevent the surface being measured from touching the forward end of the thermocouple housing.

BRIEF DESCRIPTION OF THE DRAWINGS

FIG. 1 illustrates a portable thermocouple surface probe embodying principles of the present invention and connected to a probe handle and to a digital readout meter;

FIG. 2 is a pictorial illustration of one form of the surface probe of FIG. 1;

FIG. 3 is a sectional view of the probe of FIG. 2 with the protective shield extended;

FIG. 4 shows the probe of FIG. 2 with the shield retracted and the sensor in contact with the surface of which temperature is to be measured; and FIG. 5 illustrates a modified form of surface probe heat shield.

DETAILED DESCRIPTION OF THE INVENTION

As illustrated in FIG. 1, a thermocouple surface probe 10 is detachably connected to an articulated connector head 12 on the end of a handle 14 which is electrically connected by means of a cable 16 to a digital meter 18. Handle 14 and its articulated head 12 are employed to position the probe 10 against a surface of which temperature is to be measured. With the probe pressed against a hot surface, the voltage generated by the increased temperature of the thermocouple junction of the probe sensor is transmitted back to the meter 18 via cable 16 for digital readout of the temperature of the surface.

As shown in FIGS. 2, 3 and 4, a cylindrical thermocouple housing 20, made of an electrically nonconductive ceramic material of low thermal conductivity, has a forward end 22 formed with a pair of elongated cylindrical cavities 24, 26 which open through the forward end surface 28 of the ceramic housing. Mounted within the cylindrical cavities 24, 26 are first and second coils 30, 32 of thermocouple material having their rearmost ends positioned well within the housing cavities and their forward ends projecting forwardly of the end surface 28 of the housing by approximately one or two turns. The coils are of different types of thermocouple wire material (such as, for example, chromel and alumel, respectively) and have the ends of their forwardmost turns joined together to provide the thermocouple junction 34.

The rearmost ends of the respective coil wires extend in substantially straight portions 40, 42 rearwardly through the sensor housing to connector pins 44, 46 to which they are electrically connected.

The sensor housing 20 is fixedly secured to and within the forward end of a connector body 48, on the rear end of which is mounted a rotatable knurled knob 50, retained by means of a retainer wire 52 seated in a circumferential groove on the exterior surface of the connector body. The knurled nut is internally threaded and threadedly engages the externally threaded end of the articulated head 12, which is formed with a receptacle for receiving the pin terminals 44, 46 to make an electrical connection between these terminals and the cable that connects to the meter. The interior of the sensor housing 20 and the adjoining portion of the interior of the connector body 48 are filled with a non-conductive cement of low thermal conductivity, indicated at 54. The cement securely fixes the terminal pins 44, 46 within the connector body and also securely mounts the coils 30 and 32 at their rearwardly extending ends 40 and 42. The cement covers only a few of the rearmost turns of each of the coils 30 and 32, which is sufficient to fixedly mount the rearmost ends of the coils within the sensor housing. This leaves the major forward portion of the coils free. Because the coils are resilient, the forward portion, including the thermocouple heat sensitive junction, may be readily and resiliently pressed back toward the forward end face 28 of the housing 20.

A cylindrical protective sleeve 58 is slidably mounted on the forward end of the connector body 48 and extends forwardly to circumscribe both the forward end of the sensor housing 20 and the forward end of the thermocouple sensor coils 30, 32. The forwardmost edge of the sleeve 58 is formed with a plurality of circumferentially spaced, forwardly projecting sharpened points 60, 61, 62 and 63 which project forwardly beyond the forwardmost end of the thermocouple coils and junction.

The forward end of the connector body 48 is formed with three circumferentially spaced, elongated slots of which one is illustrated at 66, each of which receives a pin, such as the illustrated pin 68, fixed to and projecting radially inwardly from a rearward portion of the protective sleeve 58. The pins 68 and slots 66 provide limits for the relative sliding motion of the sleeve axially of the connector body from the extended position illustrated in FIG. 3 to the retracted position shown in FIG. 4.

A circumferential shoulder 70 fixed to the connector body forms a seat for one end of a compression spring 72 which seats at its other end upon the rearwardly facing end of the protective shield 58 and thereby strongly urges the shield forwardly to its extended position. The pin and slot stops for the protective sleeve are positioned so that when the probe is pressed firmly against a surface 74, the sleeve is shifted to its retracted position, as illustrated in FIG. 4. In this retracted position, the forward end 28 of the ceramic temperature sensor housing is spaced by a small distance (in the order of twenty thousandths of an inch, for example) from the surface, whereas the forward end of the sensor coils and the thermocouple junction are in contact with the surface 74. In retracted position of the sleeve, the coils 30, 32 still project forwardly beyond the forwardmost ends of the pointed tips 60 through 63, although they are somewhat compressed when the probe is pressed against the surface to be measured.

Thus, it will be seen that the forward end 28 of the ceramic sensor housing cannot contact the surface and, further, that only a limited amount of compression of, and pressure upon, the thermocouple junction itself is possible. The protective sleeve 58, when in its retracted position, still provides an abutment that limits the forward motion of the probe toward the surface and also limits the pressure that can be applied against the thermocouple junction. Even though the probe is pressed with great force against the surface, the pressure applied to the sensitive thermocouple junction will not increase. This arrangement provides a longer life of the thermocouple junction, particularly when used on rough sources and, in addition, provides improved thermal contact between the junction and the surface to thereby achieve a faster response and increased accuracy.

The sharp tips 60 through 63 significantly minimize the area of contact between the protective shield and the surface being measured. This minimizes the transfer of heat from the surface to the shield, thereby ensuring that the temperature of the surface being measured is disturbed as little as possible by contact with the probe itself.

Illustrated in FIG. 5 is a slightly modified version of the protective shield. All other components of the probe are the same as described and illustrated in connection with FIGS. 2 through 4. In the arrangement of FIG. 5, the shield 80 is made with a thicker rear portion 82 and has a significantly thinner forward portion 84. The forward portion of the shield is formed with a complete and continuous circumferential forward edge 86 that is made of a still further decreased thickness. The circumferential forward edge 86 is chambered to provide a very thin line contact between the shield and a surface of which temperature is to be measured, thereby decreasing the transfer of heat from the surface to the shield. Stop pins, of which that designated at 88 is shown in the drawing, are fixedly mounted in the thicker portion 82 of the shield and extend radially inwardly at circumferentially spaced portions to project into axially elongated slots of which that illustrated at 90 is shown in FIG. 5. These slots, as in the earlier described embodiment, provide limits for the extended and retracted positions of the probe shield.

The foregoing detailed description is to be clearly understood as given by way of illustration and example only, the spirit and scope of this invention being limited solely by the appended claims.

What is claimed is:

1. A portable heat sensing surface probe comprising
   a connector body adapted to be connected to a probe handle,
   a thermocouple housing having a rearward end mounted in said body and having a forward end,
   a thermocouple sensor mounted in said housing and projecting forwardly of said forward end,
   a protective sleeve circumscribing said forward end and said projecting sensor, said sleeve being slidably mounted on said connector body for motion between a forward position in which a forward end of the sleeve projects forwardly beyond the sensor to guard the sensor against inadvertent contact and a retracted position in which said sleeve forward end is retracted to allow contact of the sensor with a surface,
   means for urging said sleeve toward said forward position whereby said sensor is normally protected by the circumscribing and projecting sleeve in its forward position and whereby said sleeve may be readily shifted to said retracted position by pressing the probe against a surface to allow the sensor to contact the surface, and
   stop means for limiting motion of said sleeve to said retracted position, the forward end of said sleeve, in said retracted position being slightly forward of the forward end of said thermocouple housing, thereby to prevent contact of said thermocouple housing and surface when said thermocouple sensor contacts the surface,
   said sensor comprising first and second resilient coils of mutually different thermocouple material extending along and within said housing, said coils having rearward ends fixed to and within the housing and having forward ends projecting beyond the housing, said forward ends being mutually interconnected to provide a thermocouple junction that is resiliently mounted to said housing.

2. The probe of claim 1 including an elongated probe handle and means for detachably securing said connector body to said handle.

3. A portable heat sensing surface probe comprising
   a cylindrical connector body adapted to be connected to a probe handle, a cylindrical thermocouple housing having a rearward end fixed to and within said connector body and having a forward end extending forwardly therefrom, said thermocouple housing having a cavity communicating with the forward end thereof, first and second elongated resilient coils of mutually different thermocouple material mounted in said cavity and extending axially of said thermocouple housing, said coils each having forward ends projecting forwardly of the forward end of the thermcouple housing and mutually interconnected to form a thermocouple junction, each said coil having a plurality of rearward turns, and an adhesive within said cavity and enveloping rearmost turns of said coils to fixedly position rearmost ends of said coils within said thermocouple housing, a protective sleeve slidably mounted on a forward end of said body and circumscribing the forward end of said thermocouple housing and said thermocouple coils, said sleeve being slidably mounted on said body for motion between an extended position in which a forward edge of the sleeve extends forwardly beyond and circumscribes the projecting forward ends of said thermocouple coils and a retracted position in which the forward end of the sleeve is slightly forward of the forward end of said thermocouple housing, stop means for limiting rearward motion of said protective sleeve to said retracted position, and resilient means for urging said sleeve to said extended position, whereby said forwardly extending thermocouple junction is protected by said sleeve when the latter is in extended position, and whereby when said probe is pressed against the surface of which temperature is to be measured the protective sleeve is driven rearwardly of the thermocouple housing until the thermocouple junction contacts the surface, and whereby further pressing of the probe against the surface will compress the thermocouple coils and further retract the protective sleeve until it attains its retracted position, and whereby further pressure of the thermocouple junction against the surface is prevented by abutment of the protective sleeve with the surface and with said stop means when the sleeve is in retracted position.

4. The probe of claim 3 wherein said stop means comprises a plurality of circumferentially spaced, axially elongated apertures in a forward end of said connector body, and a plurality of stop pins each fixed to said protective sleeve and projecting into a respective one of said elongated apertures, thereby to retain the sleeve on the connector body against the forward urging of said resilient means and to prevent motion of said protective sleeve rearwadly of said connector body beyond said retracted position.

* * * * *

UNITED STATES PATENT AND TRADEMARK OFFICE
CERTIFICATE OF CORRECTION

PATENT NO. : 4,454,370
DATED : Jun. 12, 1984
INVENTOR(S) : HENRY P. VOZNICK

It is certified that error appears in the above-identified patent and that said Letters Patent are hereby corrected as shown below:

In claim 3, column 5, line 21, "on" should be ---to---.

Signed and Sealed this

Nineteenth Day of February 1985

[SEAL]

Attest:

DONALD J. QUIGG

Attesting Officer  Acting Commissioner of Patents and Trademarks